US009417514B2

(12) United States Patent
Liu et al.

(10) Patent No.: US 9,417,514 B2
(45) Date of Patent: Aug. 16, 2016

(54) POLARIZATION PRESERVING 3D SCREEN

(71) Applicant: 3M INNOVATIVE PROPERTIES COMPANY, St. Paul, MN (US)

(72) Inventors: Richard Y. Liu, Woodbury, MN (US); Alan P. Miller, Blaine, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 296 days.

(21) Appl. No.: 14/349,013

(22) PCT Filed: Oct. 25, 2012

(86) PCT No.: PCT/US2012/061864
§ 371 (c)(1),
(2) Date: Apr. 1, 2014

(87) PCT Pub. No.: WO2013/063235
PCT Pub. Date: May 2, 2013

(65) Prior Publication Data
US 2014/0247428 A1 Sep. 4, 2014

Related U.S. Application Data

(60) Provisional application No. 61/552,298, filed on Oct. 27, 2011.

(51) Int. Cl.
*G03B 21/00* (2006.01)
*G03B 21/604* (2014.01)
*G02B 27/26* (2006.01)

(52) U.S. Cl.
CPC .............. *G03B 21/604* (2013.01); *G02B 27/26* (2013.01)

(58) Field of Classification Search
CPC ................................ G03B 21/60; G02B 27/26
See application file for complete search history.

(56) References Cited

U.S. PATENT DOCUMENTS

| | | | |
|---|---|---|---|
| 3,653,740 | A | 4/1972 | Ogura |
| 4,232,939 | A | 11/1980 | Kikuchi |
| 4,297,001 | A | 10/1981 | Antes |
| 5,148,309 | A | 9/1992 | Yamada |
| 6,144,491 | A | 11/2000 | Orikasa |
| 6,233,095 | B1 | 5/2001 | Niwa |
| 7,057,812 | B2 | 6/2006 | Sinkoff |
| 2004/0061935 | A1 | 4/2004 | Ohsako |

FOREIGN PATENT DOCUMENTS

| | | |
|---|---|---|
| GB | 1331905 | 9/1973 |
| WO | WO 03-009019 | 1/2003 |
| WO | WO 2005-036250 | 4/2005 |
| WO | WO 2009-089256 | 7/2009 |

OTHER PUBLICATIONS

International Search Report for PCT International Application No. PCT/US2012/061864, mailed on Feb. 13, 2013, 5 pages.

*Primary Examiner* — Sultan Chowdhury
*Assistant Examiner* — Danell L Owens
(74) *Attorney, Agent, or Firm* — Clifton F. Richardson

(57) ABSTRACT

Projection 3D systems and polarization preserving 3D screens are described that substantially increase polarization contrast ratio and viewing angle. The screen comprises a structured surface having a certain slope distribution, formed by a plurality of beads 120 with a layer 115 disposed thereon, which is coated by a reflective layer 110.

10 Claims, 4 Drawing Sheets

POLARIZATION PRESERVING 3D SCREEN

FIELD

The present disclosure relates to, among other things, a polarization preserving 3D screen that has a high polarization contrast ratio.

BACKGROUND

Stereoscopic 3D systems that utilize passive polarization eyewear includes a projection screen that displays the right and left eye images. Depolarization that occurs at the screen results in cross-talk, where the image intended for one eye is partially transmitted to the opposite eye, degrading the 3D visual experience.

Known 3D screens preserve some level of 3D polarization by coating silver or aluminum on a substrate such as a PVC substrate, or spray paint flakes of metal particles on a similar surface using a binder solution. The current 3D screens have relatively low polarization contrast ratio and relatively narrow total viewing angle, which causes severe cross-talk for seats far to the left or right in a theatre ("cornoer seats"), for which the viewing angle is fairly wide. The typical polarization contrast ratio of current 3D screens is from 50-180, mostly from 70-100 with total viewing angle typically less than 35 degrees. So the polarization contrast ratio at such corner seats is fairly low for at least a portion of the screen. The fairly low polarization contrast ratio leads to severe cross-talk of image signals that can cause severe headaches for some viewers. For example, a 3D screen from SilverFabric Co., (Wuppertal, Germany), SILVERFABRIC Silver 3D Professional Screeen Material, has a total viewing angle of +/−30 degrees at a gain of 2.6. The peak polarization contrast ratio is about 170 declines to a polarization contrast ratio of about 20 at about 40 degrees.

To obtain a better viewing experience for 3D projection, an improved polarization preserving 3D screen with a higher polarization contrast ratio is desired.

BRIEF SUMMARY

The present disclosure describes a polarization preserving 3D screen that has a high polarization contrast ratio, large total viewing angles, among other aspects.

In many embodiments, a 3D projection system is described. The projection system includes a projector projecting light having a first polarization state. A front projection screen receives the projected light from a viewing side of the front projection screen and reflecting the received light to a viewer. The ratio of the reflected light having the first polarization state to the reflected light having a second polarization state orthogonal to the first polarization state can be at least 250, and in many embodiments the total viewing angle is at least 35 degrees. The front projection screen includes a support layer and a plurality of beads partially embedded in the support layer. Unembedded portions of the beads on the viewing side of the screen define a first structured surface having a first slope distribution. In many embodiments, at least 50% of the first structured surface has a slope magnitude that is greater than about 20 degrees. A first layer is disposed on the first structured layer and defines a second structured surface having a second slope distribution different than the first slope distribution. No more than about 5% of the second structured surface has a slope magnitude that is greater than about 30 degrees, and at least 50% of the second structured surface has a slope magnitude that is greater than about 2 degrees. A reflective layer is disposed on the second structured layer and reflects the projected light received by the front projection screen.

In another embodiment, a 3D projection screen is described. The 3D projection screen is described above with respect to the projection system and further includes a light absorbing layer absorbing at least 90% of visible light which reaches it. The light absorbing layer can be incorporated in any of the layers below the top-most surface.

In yet another embodiment, a 3D projection screen is described. The 3D projection screen is described above with respect to the projection system and further includes a second structured layer disposed on the reflective layer and defining a third structured surface having a third slope distribution different than the first and second slope distributions.

The 3D projection systems or 3D screen articles described herein may provide one or more advantages over prior 3D projection systems or 3D screen articles. For example, prior 3D projection systems and 3D screen articles suffered from low polarization contrast ratios and provided narrow total viewing angles. The 3D projection systems and 3D screen articles described herein provide greater polarization contrast ratios and wider viewing angles than the prior systems and screen articles. These and other advantages of the various embodiments of the devices and methods described herein will be readily apparent to those of skill in the art upon reading the disclosure presented herein.

BRIEF DESCRIPTION OF THE DRAWINGS

The disclosure may be more completely understood in consideration of the following detailed description of various embodiments of the disclosure in connection with the accompanying drawings, in which.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

The present disclosure describes, among other things, a polarization preserving 3D screen that has a high polarization contrast ratio and wide total viewing angles. As described herein, the systems and polarization preserving 3D screens described herein substantially increase polarization contrast ratio and viewing angle. While the present disclosure is not so limited, an appreciation of various aspects of the disclosure will be gained through a discussion of the examples provided below.

Figure 1A:
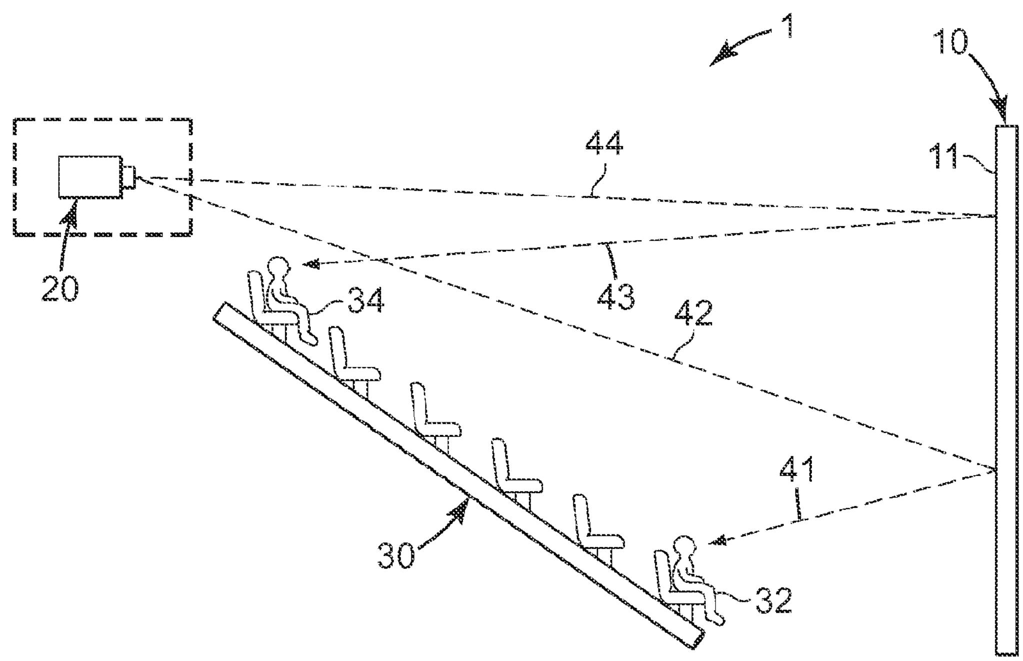
FIG. 1A is a schematic diagram side view of an illustrative movie theater.
Figure 1B:
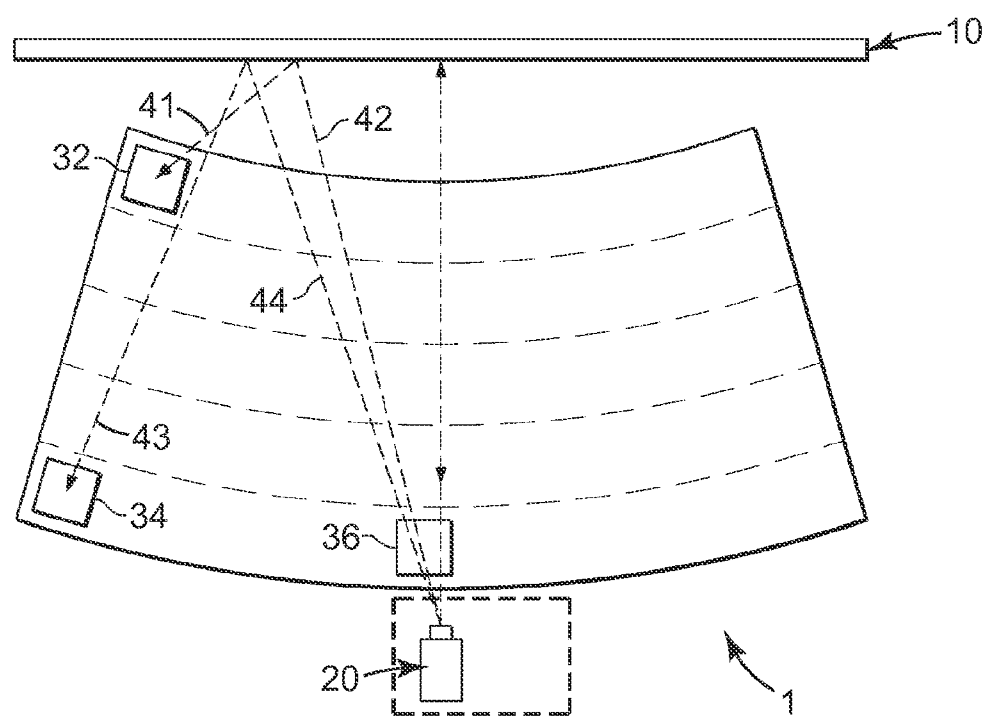
FIG. 1B is a schematic diagram top view of the illustrative movie theater of FIG. 1A.

FIG. 1A is a schematic diagram illustrating a side view of a movie theatre and FIG. 1B is a schematic diagram showing a top-down view of the movie theatre. Movie theatre has a projection system 1 and a viewing area 30. Projection system 1 includes a reflective screen or front projection screen 10 and a projection source 20 projecting light 44, 42 having a first polarization state. A 3D projection source 20 provides left-eye imagery with one polarization state and right-eye imagery with an orthogonal polarization state.

The front projection screen 10 receives the projected light 44, 42 (e.g., right-eye imagery and left-eye imagery) from a viewing side 11 of the front projection screen 10 and reflects (reflected light 43, 41) the received light to a viewer, a ratio of the reflected light 43, 41 having the first polarization state to the reflected light having a second polarization state perpendicular or orthogonal to the first polarization state being at least 250, or at least 500 or at least 1000, as desired. In many embodiments, the front projection screen 10 has a total viewing angle of at least 35 degrees, or at least 50 degrees, or at least 60 degrees or greater, or at least 70 degrees or greater while at the same time the screen provides a high polarization contrast ratio.

The theater includes a viewing area 30 that can include seats organized in rows or any other configuration. For example, a first viewer may be located at the front-left viewing position 32 of the movie theatre, and receive reflected light 41. A second viewer may be located at the rear-left viewing position 34 and receive reflected light 43. A third viewer can be located in a central viewing position 36.

Figure 2:
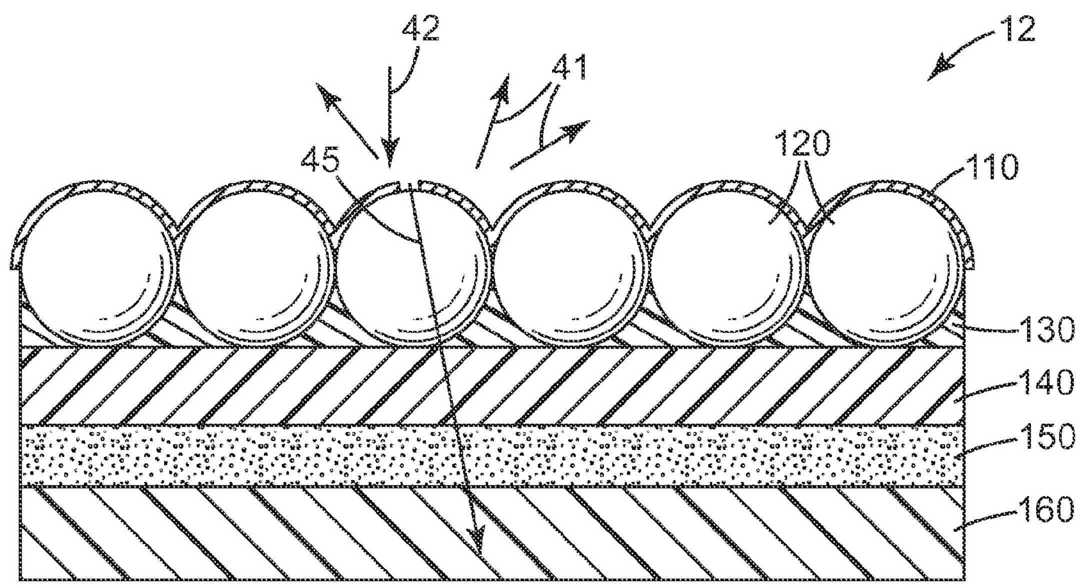
FIG. 2 is a schematic cross-sectional view of an illustrative projection screen.
Figure 3:
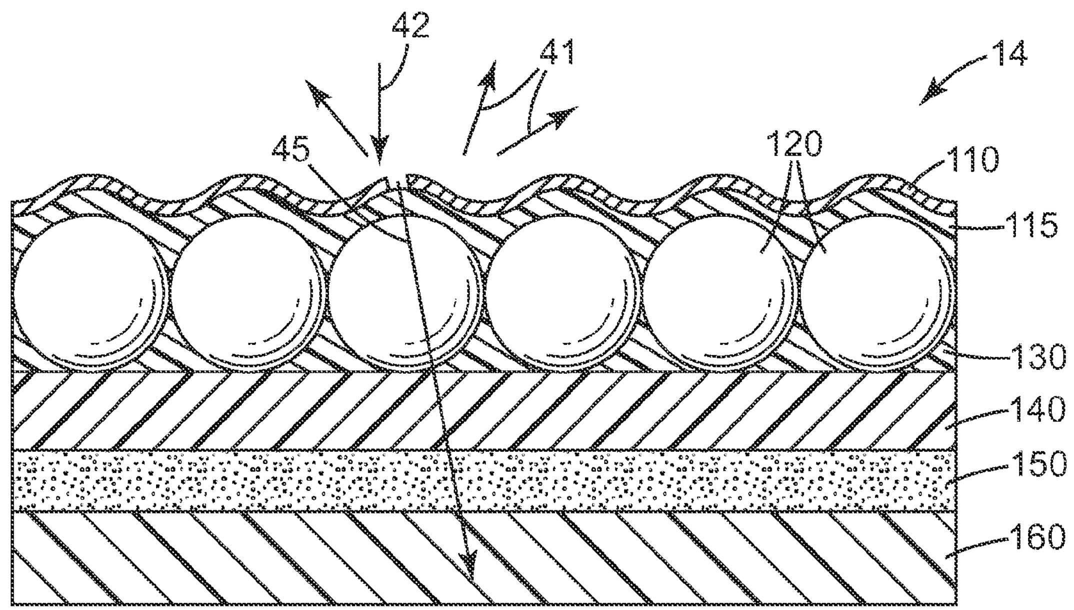
FIG. 3 is a schematic cross-sectional view of another illustrative projection screen.
Figure 4:
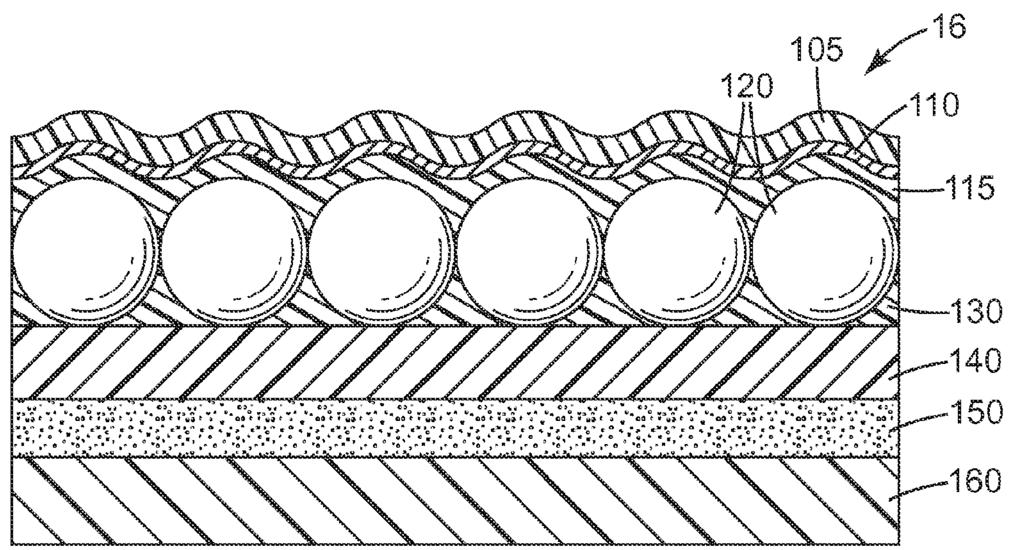
FIG. 4 is a schematic cross-sectional view of another illustrative projection screen.

The front projection screen 10 described herein provides polarization preserving 3D screen 10 that has a high polarization contrast ratio and in many embodiments, an improved total viewing angle. FIGS. 2-4 are schematic cross-sectional views illustrative projection screens 12, 14 and 16. Projected light 42 having either a first polarization state or a second orthogonal polarization state is incident on the illustrative projection screens 12, 14 and 16 and reflected forming reflected light 41. The projection screens described herein preserve the respective polarization of the projected (incident) light 42 and maintain that polarization in the resulting reflected light 41. This polarization preservation function is characterized by the magnitude of the polarization contrast ratio.

The illustrative projection screens 12, 14 and 16 include a substrate or support layer 140. The support layer 140 can be formed of any useful material. Support layer 140 material can be formed from polymers such as vinyl, PET, polycarbonate, acrylate, cellulose, for example. The Support layer 140 can have any useful thickness such as, from 1 to 10000 micrometers, or from 10 to 1000 micrometers.

A plurality of beads 120 is disposed on the support layer 140. The plurality of beads 120 can be embedded in a binder layer 130 adhering the plurality of beads 120 to the support layer 140. Unembedded portions of the beads on the viewing side of the screen define a first structured surface having a first slope distribution. At least 50% of the first structured surface has a slope magnitude that is greater than about 20 degrees.

The binder layer 130 can be any material that can adhere the beads 120 to the support layer 140. In many embodiments the binder layer 130 is polymeric such as, vinyl, polyurethane, polyester, or materials available under the trade designation KRATON, for example. The binder layer 130 can have any useful thickness. In many embodiments, binder layer 130 has a thickness in a range from 1 to 50 micrometers, or from 5 to 40 micrometers.

The beads 120 can be any bead material that can form the first structured surface. In many embodiments, the beads are formed of a glass, ceramic or polymeric material such as polystyrene, polyacrylates, polycarbonates, for example. The beads 120 can have any useful size (i.e., diameter) or distribution of sizes. In many embodiments, the beads 120 have a diameter in a range from 1 to 1000 micrometers or from 10 to 100 micrometers.

In many embodiments, a first layer 115 is disposed on the first structured layer (formed by the plurality of beads 120 and associated binder layer 130) and defining a second structured surface having a second slope distribution different than the first slope distribution. No more than about 5% of the second structured surface has a slope magnitude that is greater than about 30 degrees and at least 50% of the second structured surface has a slope magnitude that is greater than about 2 degrees. The plurality of beads 120 can be either closely packed or loosely packed with some gap space between adjacent beads, as desired. Gap distances can be any range of distances such as 0.001 micrometers to 20 micrometers or from 0.1 micrometers to 10 micrometers, for example.

The first layer 115 can be formed of any polymeric material that can conform to the bead 120 surface. In many embodiments, first layer 115 is formed of vinyl, polyurethane, polyester, polyolefin or materials available under the trade designation KRATON, for example. The first layer 115 can have any useful thickness. In many embodiments, first layer 115 has a thickness in a range from 1 to 100 micrometers, or from 5 to 50 micrometers. The outer surface of the first layer 115 can define the second structured layer topography.

A reflective layer 110 can be disposed on the second structured layer as shown in FIGS. 3 and 4, or it can be disposed directly on the bead 120 surface as is shown in FIG. 2. The reflective layer 110 reflects the projected light received by the front projection screen. In many embodiments the reflective layer 110 is a metal layer such as silver or aluminum, for example. The reflective layer 110 can be coated onto the second structured layer or bead surface via sputtering or vapor coating, for example. The reflective layer 110 can have any useful thickness. In many embodiments, reflective layer 110 has a thickness in a range from 10 to 1000 Angstroms, or from 10 to 100 Angstroms. The reflective layer 110 has an intergrated reflectivity. In many embodiments, reflective layer 110 has a reflectivity of 70% or greater, or 80% or greater, or 85% or greater for visible light wavelengths from incident angles. The reflective layer 110 can have any useful opacity. In many embodiments, reflective layer 110 has opacity from 1 to 4.

In some instances a void may be present in the reflective layer 110 and the void allows stray light 45 to enter into the projection screen 12, 14. A light absorbing layer 160 can then absorb the stray light 45 and prevent the stray light from exiting the projection screen 12, 14.

In many embodiments an adhesive layer 150 adheres the light absorbing layer 160 to the support layer 140. The adhesive layer 150 can be formed of any useful adhesive material that can adhere the light absorbing layer 160 to the support layer 140. In many embodiments the adhesive layer 150 is a pressure sensitive adhesive, hot-melt adhesive, or thermoset adhesive. The adhesive layer 150 can have any useful thickness. In many embodiments, adhesive layer 150 has a thickness in a range from 10 to 100 micrometers, or from 20 to 100 micrometers.

The light absorbing layer 160 can be formed of any useful light absorbing material. The light absorbing layer 160 can absorb any light that is not reflected at the reflective layer 110 or light that breaches the reflective layer 110 and enters the projection screens 12, 14 and 16. In many embodiments the light absorbing layer 160 absorbs at least 90% or at least 99% of visible light incident of the light absorbing layer 160. The light absorbing layer 160 can form the binder layer, adhesive layer or other layers forming the projection screen other than the reflective layer.

In many embodiments the light absorbing layer 160 is formed of a polymer blended with light absorbing particles. Useful polymers include vinyl, PET, polycarbonate, nylon, acrylate, cellulose and the like. Useful light absorbing particles include dyes, pigments, carbon black, carbon nanotubes, or mixtures thereof. The light absorbing layer 160 can have any useful thickness. In many embodiments, light absorbing layer 160 has a thickness in a range from 1 to 100 micrometers, or from 10 to 60 micrometers.

In many embodiments, a second layer 105 is disposed on the reflective layer 110. The second layer 105 can operate to protect the reflective layer 110. The second layer 105 can be formed of any useful polymer. Useful polymers include vinyl, polyurethane, acrylate and the like. The polymers can be thermoplastic or cross-linked to improve durability of the second layer 105. In many embodiments, second layer 105 has a thickness in a range from 0.1 to 30 micrometers, or from 1 to 10 micrometers. It has been found that increasing the thickness above a certain point degrades the polarization contrast ratio of the disclosed front projection screens.

In some embodiments, a 3D screen can be made by replicating the surface topology of the screen 12 or 14 and then coating the replicated surface with a reflective layer. The replication is readily done by casting a polymer solution on the screen 12 or 14 surface and the drying or curing in an oven, followed by removal of the replicated surface from the original. This negative replicated surface can be utilized as obtained, or can be used as the mold for a second replication process to obtain a positive replicated surface of screen 12 or 14. A reflective surface layer can then be applied to the resulting replicated negative or positive surface. The resulting screens have comparable excellent performance to screen 14.

EXAMPLES

Test Methods

Slope Gradient Magnitude—The slope gradient magnitude was measured by a Confocal Scanning Laser Microscopy (KEYENCE VK-9700 Color 3D Laser Scanning Microscope, Keyence Corp. of America, Chicago, Ill.). An approximately 1×1 cm specimen was cut from the central portion of a material to be tested. The test specimen was mounted on a clean glass microscope slide using SCOTCH Core Series 2-0300 Double-Sided Tape (3M Co., St. Paul, Minn.). The mounted sample was Au—Pd sputter-coated using a DENTON DESK III TSC Sputter Coater (Denton Vacuum LLC., Moorestonwn, N.J.) at 30 mA performing 8 sputter runs of 15 sec each with a 10 sec rest between sputter runs. Measurement settings: Real Peak Detection (RPD): On; Mode: Surface profile; Area: Plane; Quality: Super fine; Objectives: 50× or 150×. MATLAB software (MathWorks, Natick, Mass.) was used to calculate the slope distribution.

Figure 5:
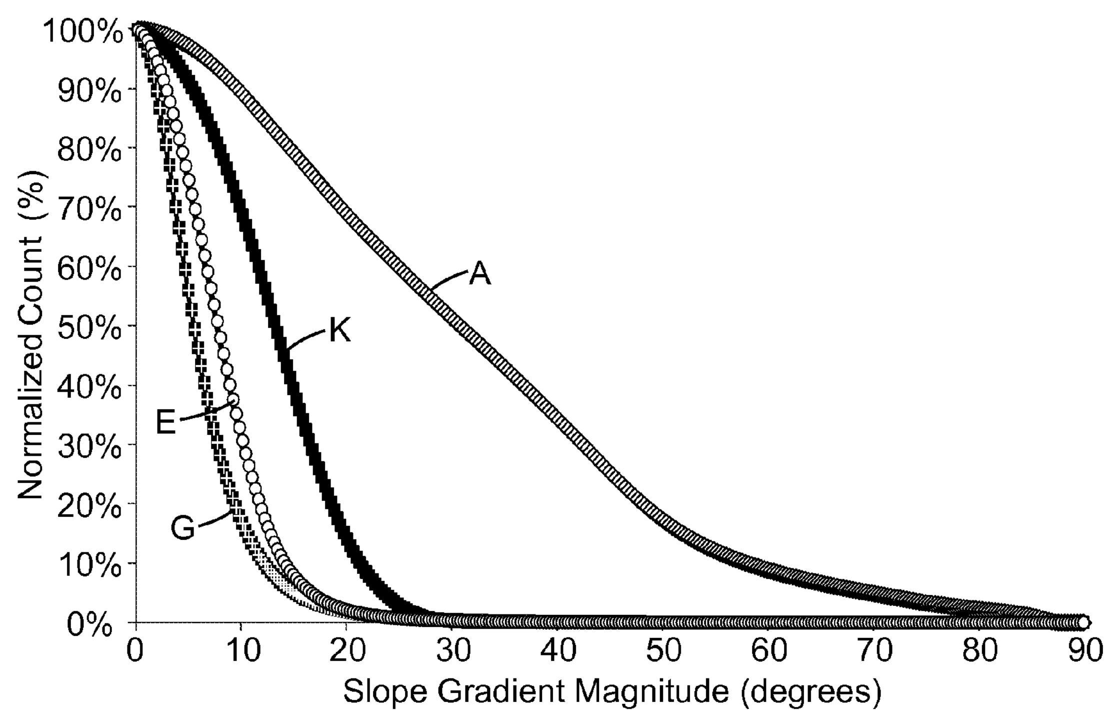
FIG. 5 is a graph of the cumulative slope gradient magnitude distribution of the examples.

FWHM—Full width at half maximum (FWHM) is defined to be the slope gradient magnitude at a normalized count of 50% in a plot such as those shoen in FIG. 5.

Gain—Gain is defined by the ratio of the on-axis brightness of the screen to that of a lambertian standard surface. A gain of 2.0, for example, means that the on-axis brightness (light reflected) of a given screen is twice that of a lambertian standard reference.

Total ½ Gain Viewing Angle—Total ½ Gain Viewing Angle is defined as the vertex angle of a viewing cone within which the reflected brightness is above ½ of its on-axis value. In practice, the angle is scanned in one given direction (either horizontal or vertical), with a scan beginning on-axis. Thus, the Total ½ Gain Viewing Angle is twice the value of the viewing angle which exhibits 50% of the on-axis gain, when tracing the reflected brightness profile from 0 to 90 degrees. For example, if a specimen is measured to have a viewing angle (at 12 of its on-axis brightness) to be ±20 degrees, its Total ½ Gain Viewing Angle total viewing angle is 2×20 degrees, i.e. 40 degrees.

Polarization Contast Ratio ("PCR")—Polarization Contast Ratio is defined as the ratio of the intensity of reflected light having a first polarization state to the intensity of reflected light having a second polarization state orthogonal to the first polarization state. For example, for a light source sending polarized light to a screen surface, the screen surface may, for example, reflect light having the same polarization sense as the source in an amount of 100 lumens intensity, at a given angle while it also reflects light having the orthogonal polarization sense in an amount of 1 lumen intensity. The Polarization Contrast Ratio for this specific viewing angle would be calculated as the ratio of the two values, 1001. That is 100. PCR is a good measure of the degree of cross-talk in a polarization preserving 3D screen

Comparative Example 1 Vapor Coated Beaded Diffuser Film

A beaded diffuser film commercially available under the trade designation VIKUITI Frost Rear Projection Film (3M Company, St. Paul, Minn.) was vapor coated with aluminum to an opacity of about 2. The side of the vapor coated film opposed to the vapor coating was then laminated to a light absorbing film of about 2 mil thickness commercially available from 3M Co. under the trade name SCOTCHCAL ELECTROCUT Graphic Film using an optically clear adhesive commercially available from 3M Co. under the trade name OCA 8171. The resulting screen surface was tested on the beaded side for its 3D performance. As shown in the table, the beaded screen film exhibited poor polarization contrast ratio.

Example 2 Vapor Coated and Overcoated Beaded Diffuser Film

A layer of polymer binder about 30 micrometers thick (after drying) was coated from solution onto a standard commercially available 50 micrometer thick PET film substrate. The coating solution was a solution of an optically clear polymer blend binder in a mixed solvent, the binder having as major component the polymer of acetic acid ethenyl ester with ethenol, cyclic acetal with butanal, C.A.S No. 68648-78-2 and, as a minor component, the polymer of caster oil with adipic acid, diethylene glycol, and phthalic anhydride, C.A.S. No. 68915-42-4, and the solvent having light aromatic solvent naphtha as the major component and 2-butoxyethanol as a minor component. Before the binder layer was dried, spherical glass beads of about 40-100 micrometers were placed upon the binder layer. The film was then dried in an oven. Another layer of less than 10 micrometers (when dried) of the same material as the first polymer binder layer was then coated onto the beaded surface and dried in an oven. The dried film was vapor coated with an aluminum layer, to an opacity of about 2. The side of the vapor coated film opposite the vapor coated side was then laminated to a light absorbing film of about 2 mil thickness commercially available from 3M Co. under the trade name SCOTCHCAL ELECTROCUT Graphic Film, using an optically clear adhesive commercially available from 3M Co. under the trade name OCA 8171. The resulting screen surface was tested on the beaded and vapor coated side for its 3D performance.

Example 3 Protected Vapor Coated and Overcoated Beaded Diffuser Film

The resulting screen article of Example 2 was then coated with an additional protective layer of the same optical binder polymer blend of about 1-15 micrometers dried thickness and dried in an oven. The resulting screen surface was tested on the beaded and vapor coated side for its 3D performance.

Comparative Example 4 Commercial Screen Article

A comparative screen article was obtained commercially under the trade designation SILVERFABRIC Silver 3D Professional Screen Material from the Silver Fabric Company, Wuppertal, Germany. The comparative screen surface was tested for its 3D performance.

Results

The four examples were tested according to the test methods described above. The test results are shown in Table 1. As shown in the table, the Comparative Example C1 (designated "A" in the Figures) had very low polarization contrast ratio which is believed to be due to its surface topology being undesirable as shown by the FWHM value being outside of the described optimum range. The Comparative Example of C4 (designated "G" in the Figures) also had relatively low polarization contrast ratio and relatively narrow viewing angle. The Example 2 (Designated "E" in the Figures) demonstrated improved polarization contrast ratio of about 1500 with high gain and wide total viewing angle. With a protective layer on the top reflective surface there was still a high gain, high polarization contrast ratio and wide total viewing angle, as shown by Example 3 (designated "K" in the Figures) which is believed to be due to its desirable surface topology as measured by its FWHM value. The high viewing angle performance of the Examples is illustrated by comparing the polarization contrast ratio values at 40 degree viewing angle. The Examples of present disclosure, 2("E") and 3("K"), had high polarization contrast ratio values of 300-700 as compared to those of Comparative Examples of C1("A") and C4("G"), having low polarization contrast ratio values of 7-20.

TABLE 1

| Example | FWHM (degrees) | Gain | Total ½ Gain Viewing Angle (degrees) | Polarization Contrast Ratio (On-axis) | Polarization Contrast Ratio (±40 degrees) |
|---|---|---|---|---|---|
| 1(A) | 31 | 1.0 | 164 | 8 | 7 |
| 2(E) | 8 | 3.1 | 36 | 1542 | 700 |
| 3(K) | 13 | 2.3 | 78 | 787 | 300 |
| 4(G) | 6 | 2.6 | 30 | 174 | 20 |

Figure 6:
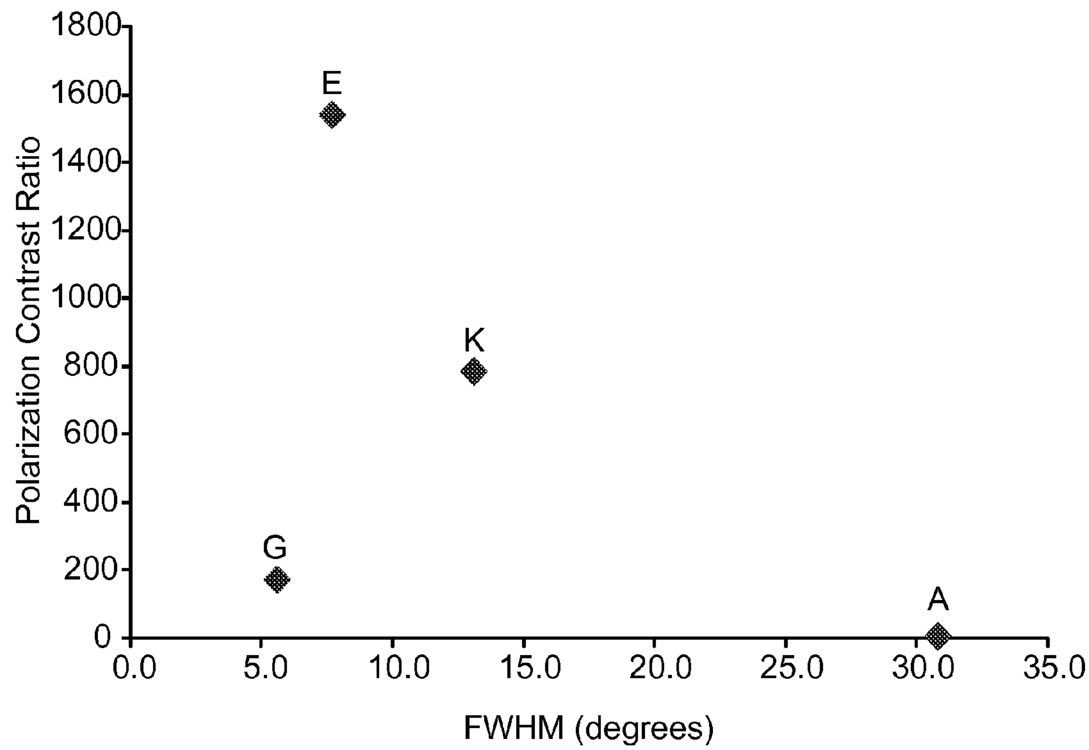
FIG. 6 is a graph of the polarization contrast ratio verses FWHM of the examples.
Figure 7:
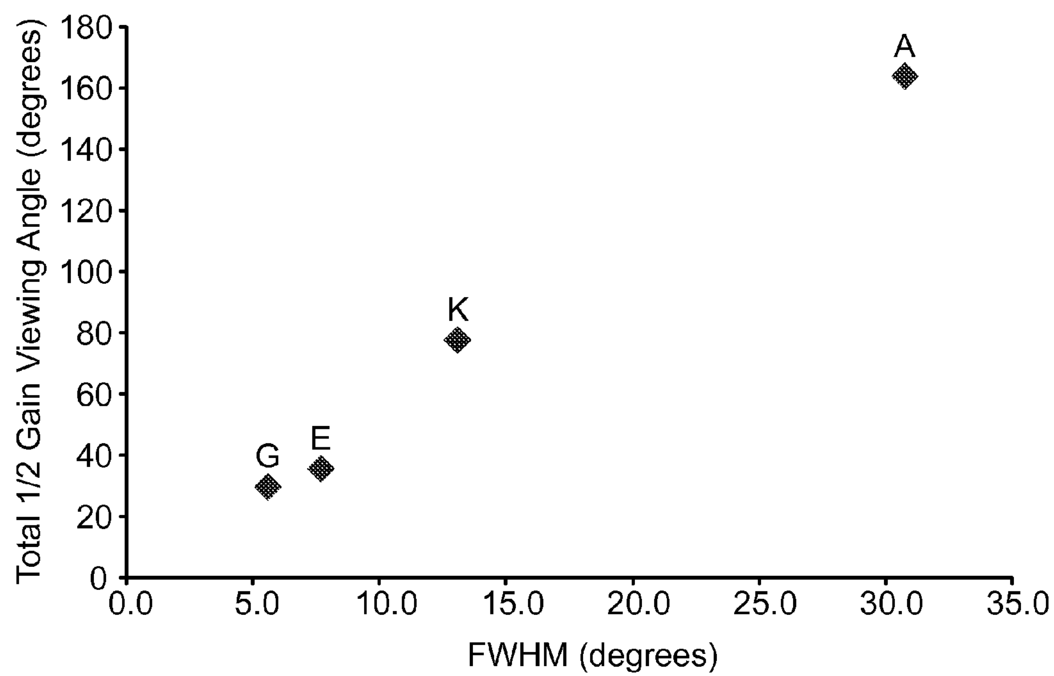
FIG. 7 is graph of the total viewing angle verses FWHM of the examples.

The slope gradient magnitude for each of the Examples is illustrated in FIG. 5. FIG. 6 is a graph of the polarization contrast ratio versus FWHM for the Examples. FIG. 7 is graph of the total viewing angle versus FWHM for the Examples. Curve A or point A corresponds to Example C1, curve E or point E corresponds to Example 2, curve K or point K corresponds to Example 3, and curve G or point G corresponds to Example C4.

Thus, embodiments of POLARIZATION PRESERVING 3D SCREEN are disclosed. One skilled in the art will appreciate that the optical films and film articles described herein can be practiced with embodiments other than those disclosed. The disclosed embodiments are presented for purposes of illustration and not limitation.

Item 1 is a projection system comprising: a projector projecting light having a first polarization state; a front projection screen receiving the projected light from a viewing side of the front projection screen and reflecting the received light to a viewer, a ratio of the reflected light having the first polarization state to the reflected light having a second polarization state perpendicular to the first polarization state being at least 250, the front projection screen comprising: a support layer; a plurality of beads partially embedded in the support layer, unembedded portions of the beads being on the viewing side of the screen and defining a first structured surface having a first slope distribution; a first layer disposed on the first structured layer and defining a second structured surface having a second slope distribution different than the first slope distribution, no more than about 5% of the second structured surface having a slope magnitude that is greater than about 30 degrees, at least 50% of the second structured surface having a slope magnitude that is greater than about 2 degrees; and a reflective layer disposed on the second structured layer and reflecting the projected light received by the front projection screen.

Item 2 is the projection system of item 1, wherein the front projection screen further comprises a light absorbing layer disposed on the support layer opposite the plurality of beads.

Item 3 is the projection system of item 1, wherein the front projection screen further comprises a second layer disposed on the reflective layer.

Item 4 is the projection system of item 3, wherein the second layer defines a third structured surface having a third slope distribution different than the first and second slope distributions.

Item 5 is the projection system of item 1, wherein at least 50% of the first structured surface has a slope magnitude that is greater than about 20 degrees.

Item 6 is the projection system of item 1, wherein the ratio of the reflected light having the first polarization state to the reflected light having a second polarization state perpendicular to the first polarization state being at least 500.

Item 7 is the projection system of item 1, wherein the ratio of the reflected light having the first polarization state to the reflected light having a second polarization state perpendicular to the first polarization state being at least 1000.

Item 8 is the projection system of item 1, wherein the front projection screen has a total viewing angle of 35 degrees or greater.

Item 9 is the projection system of item 1, wherein the front projection screen has a total viewing angle of 60 degrees or greater.

Item 10 is a front projection screen comprising: a light absorbing layer absorbing at least 90% of visible light; a support layer disposed on the light absorbing layer; a plurality of beads partially embedded in the support layer, unembedded portions of the beads defining a first structured surface having a first slope distribution; a first layer disposed on the first structured layer and defining a second structured surface having a second slope distribution different than the first slope distribution, no more than about 5% of the second structured surface having a slope magnitude that is greater than about 30 degrees, at least 50% of the second structured surface having a slope magnitude that is greater than about 2 degrees; and a reflective layer disposed on the second structured layer.

Item 11 is the front projection screen of item 10 being adapted to receive light having a first polarization state and reflect the received light such that a ratio of the reflected light having the first polarization state to the reflected light having a second polarization state perpendicular to the first polarization state is at least 250.

Item 12 is the front projection screen of item 10 being adapted to receive light having a first polarization state and reflect the received light such that a ratio of the reflected light having the first polarization state to the reflected light having a second polarization state perpendicular to the first polarization state is at least 500.

Item 13 is the front projection screen of item 10 wherein the light absorbing layer absorbing at least 99% of visible light.

Item 14 is the front projection screen of item 10 wherein at least 50% of the first structured surface having a slope magnitude that is greater than about 20 degrees.

Item 15 is the front projection screen of item 10 being adapted to receive light having a first polarization state and reflect the received light such that a ratio of the reflected light having the first polarization state to the reflected light having a second polarization state perpendicular to the first polarization state is at least 1000.

Item 16 is a front projection screen comprising: a support layer; a plurality of beads partially embedded in the support layer and defining a first structured surface having a first slope distribution, at least 50% of the first structured surface having a slope magnitude that is greater than about 20 degrees; a first layer disposed on the first structured layer and defining a second structured surface having a second slope distribution different than the first slope distribution, no more than about 5% of the second structured surface having a slope magnitude that is greater than about 30 degrees, at least 50% of the second structured surface having a slope magnitude that is greater than about 2 degrees; a reflective layer disposed on the second structured layer; and a second layer disposed on the reflective layer and defining a third structured surface having a third slope distribution different than the first and second slope distributions.

Item 17 is the front projection screen of item 16 being adapted to receive light having a first polarization state and reflect the received light such that a ratio of the reflected light having the first polarization state to the reflected light having a second polarization state perpendicular to the first polarization state is at least 250.

Item 18 is the front projection screen of item 16 being adapted to receive light having a first polarization state and reflect the received light such that a ratio of the reflected light having the first polarization state to the reflected light having a second polarization state perpendicular to the first polarization state is at least 500.

Item 19 is the front projection screen of item 16 wherein the second layer has a thickness in a range from 0.1 to 30 micrometers.

Item 20 is the front projection screen of item 16 wherein the second layer has a thickness in a range from 1 to 10 micrometers.

Item 21 is the front projection screen of item 16 wherein the second layer comprises a polymer.

What is claimed is:

1. A projection system comprising:

a projector projecting light having a first polarization state;

a front projection screen receiving the projected light from a viewing side of the front projection screen and reflecting the received light to a viewer, a ratio of the reflected light having the first polarization state to the reflected light having a second polarization state perpendicular to the first polarization state being at least 250, the front projection screen comprising:

a support layer;

a plurality of beads partially embedded in the support layer, unembedded portions of the beads being on the viewing side of the screen and defining a first structured surface having a first slope distribution;

a first layer disposed on the first structured layer and defining a second structured surface having a second slope distribution different than the first slope distribution, no more than about 5% of the second structured surface having a slope magnitude that is greater than about 30 degrees, at least 50% of the second structured surface having a slope magnitude that is greater than about 2 degrees; and a reflective layer disposed on the second structured layer and reflecting the projected light received by the front projection screen.

2. The projection system of claim 1, wherein the front projection screen further comprises a second layer disposed on the reflective layer.

3. The projection system of claim 2, wherein the second layer defines a third structured surface having a third slope distribution different than the first and second slope distributions.

4. The projection system of claim 1, wherein at least 50% of the first structured surface has a slope magnitude that is greater than about 20 degrees.

5. A front projection screen comprising:
a light absorbing layer absorbing at least 90% of visible light;
a support layer disposed on the light absorbing layer;
a plurality of beads partially embedded in the support layer, unembedded portions of the beads defining a first structured surface having a first slope distribution;
a first layer disposed on the first structured layer and defining a second structured surface having a second slope distribution different than the first slope distribution, no more than about 5% of the second structured surface having a slope magnitude that is greater than about 30 degrees, at least 50% of the second structured surface having a slope magnitude that is greater than about 2 degrees; and
a reflective layer disposed on the second structured layer.

6. The front projection screen of claim 5 being adapted to receive light having a first polarization state and reflect the received light such that a ratio of the reflected light having the first polarization state to the reflected light having a second polarization state perpendicular to the first polarization state is at least 250.

7. The front projection screen of claim 5 wherein the light absorbing layer absorbing at least 99% of visible light.

8. The front projection screen of claim 5 wherein at least 50% of the first structured surface having a slope magnitude that is greater than about 20 degrees.

9. A front projection screen comprising:
a support layer;
a plurality of beads partially embedded in the support layer and defining a first structured surface having a first slope distribution, at least 50% of the first structured surface having a slope magnitude that is greater than about 20 degrees;
a first layer disposed on the first structured layer and defining a second structured surface having a second slope distribution different than the first slope distribution, no more than about 5% of the second structured surface having a slope magnitude that is greater than about 30 degrees, at least 50% of the second structured surface having a slope magnitude that is greater than about 2 degrees;
a reflective layer disposed on the second structured layer; and
a second layer disposed on the reflective layer and defining a third structured surface having a third slope distribution different than the first and second slope distributions.

10. The front projection screen of claim 9 being adapted to receive light having a first polarization state and reflect the received light such that a ratio of the reflected light having the first polarization state to the reflected light having a second polarization state perpendicular to the first polarization state is at least 250.

* * * * *